United States Patent [19]

Pentith

[11] 4,281,759
[45] Aug. 4, 1981

[54] CONVEYORS

[75] Inventor: Gerald R. O. Pentith, Hoyland Nether nr. Barnsley, England

[73] Assignee: Pitcraft Summit Limited, Hoyland Nether nr. Barnsley, England

[21] Appl. No.: 117,517

[22] Filed: Feb. 1, 1980

[51] Int. Cl.³ .................. B65G 19/04; E21C 35/20
[52] U.S. Cl. ...................... 198/725; 198/457; 198/836; 299/43
[58] Field of Search ............... 198/725–726, 198/735, 729, 457, 836, 434, 626, 831; 299/34, 43

[56] References Cited

U.S. PATENT DOCUMENTS 3,701,407  10/1972  Kulig ................... 198/457

FOREIGN PATENT DOCUMENTS 717593  10/1954  United Kingdom ........... 299/34

242831  9/1969  U.S.S.R. ................... 198/729

Primary Examiner—Robert B. Reeves
Assistant Examiner—Douglas D. Watts
Attorney, Agent, or Firm—Trexler, Wolters, Bushnell & Fosse, Ltd.

[57] ABSTRACT

A scraper chain conveyor with conveyor pans defining a bend round which flight bars are guided in the general plane of the conveyor is provided at the outside of the bend with an auxiliary conveying unit comprising two spaced apart sprockets rotatable about upstanding axes, a line joining the axes being parallel to a tangent to the bend at least when the auxiliary conveying unit is in use, at least one endless auxiliary chain trained round the sprockets, and means for driving the auxiliary chain in a direction such that its chain run adjacent the scraper chain conveyor moves in the direction of feed of the scraper chain conveyor.

13 Claims, 6 Drawing Figures

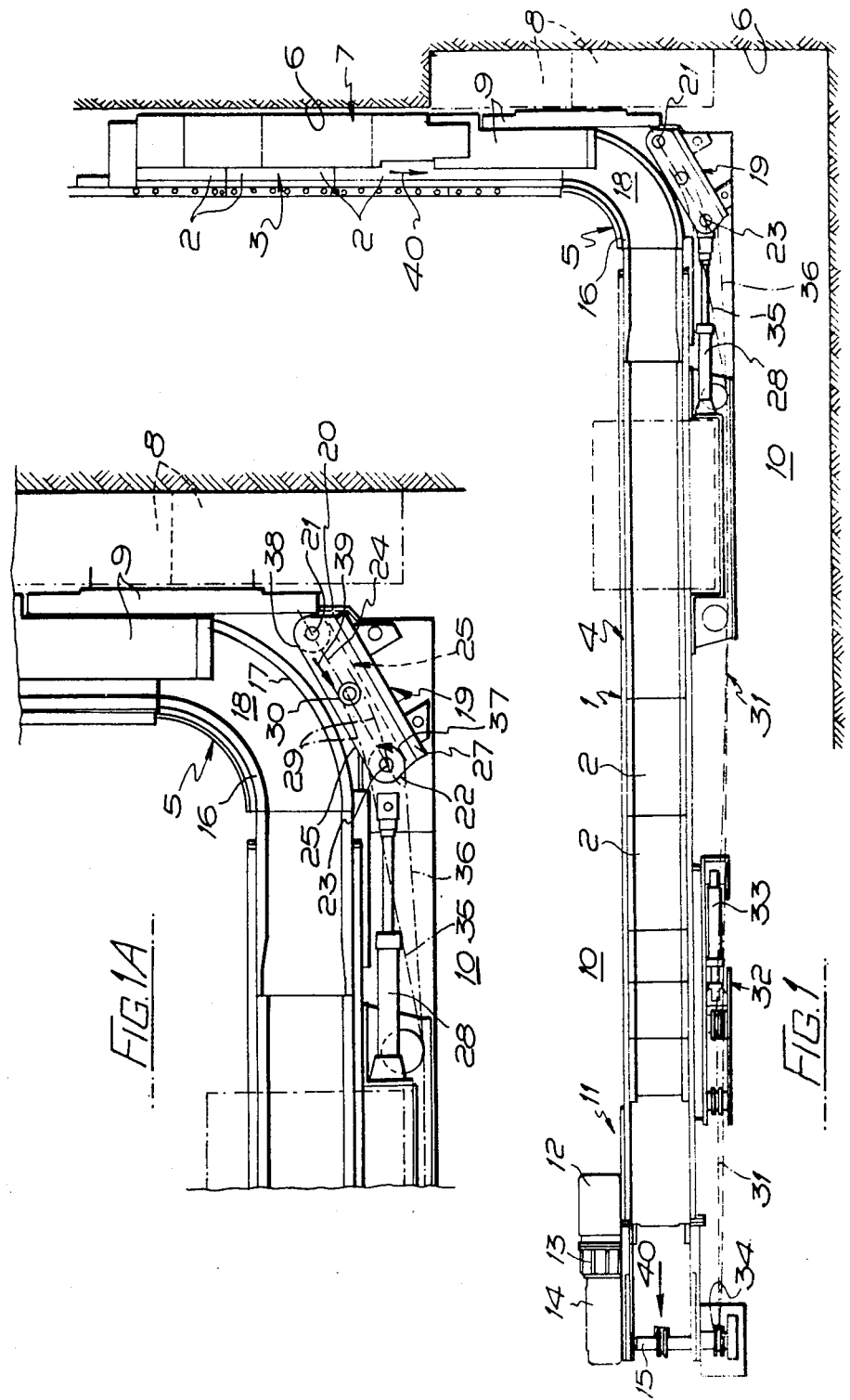

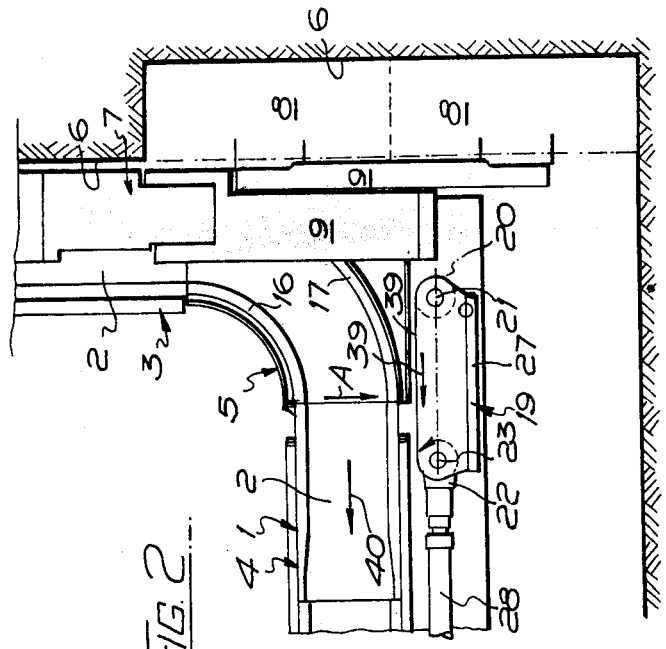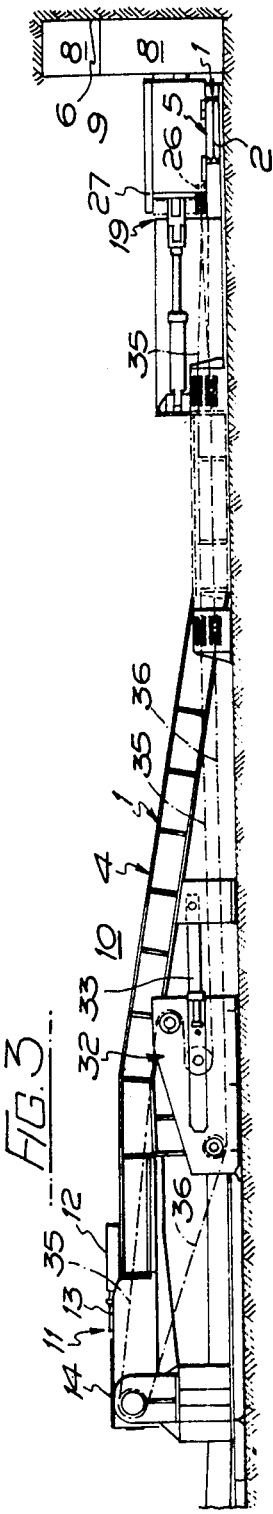

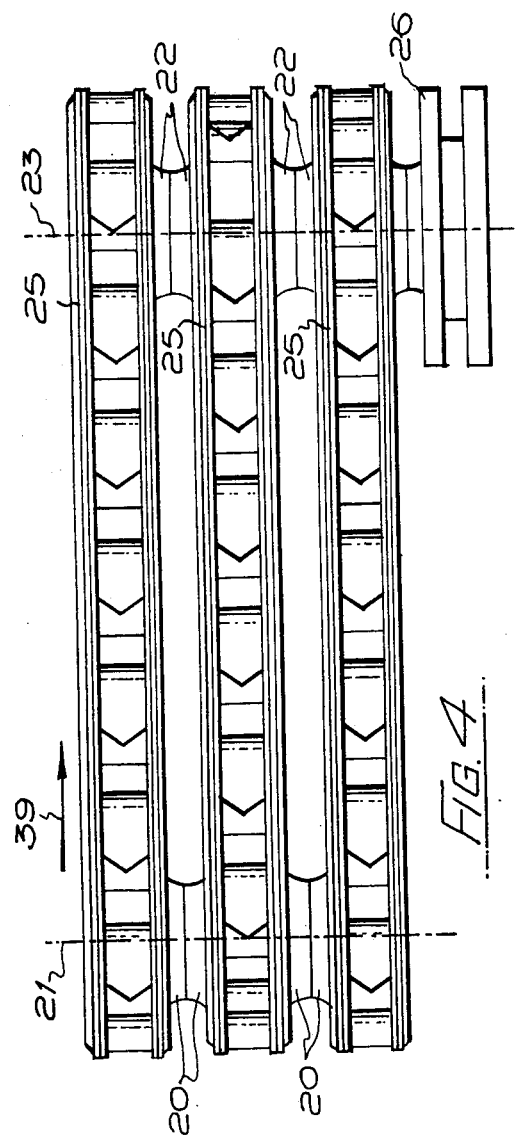
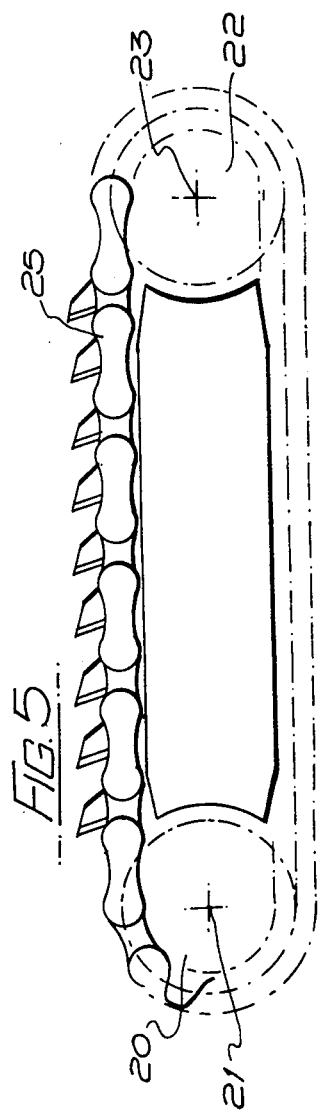

CONVEYORS

This invention relates to scraper chain conveyors made up of a plurality of individual pans secured together end-to-end, and with flight bars guided round at least one bend lying in the general plane of the conveyor.

Although few problems are now encountered in guiding the flight bars of a scraper chain conveyor of the single or twin centre strand type arond a bend between runs of the conveyor at right angles to each other, an area inevitably exists beyond the outside of the outer side of conveyor pan(s) defining the bend in to which lumps of coal or other mineral tend to be inadvertently discharged instead of being carried round the bend by the flight bars into the other run of the conveyor. To attempt to alleviate this problem, it is known to provide a curved deflector plate extending upwardly from the outside of the bend but whilst offering some improvement, this provision is not a wholly satisfactory solution because lumps of coal or other mineral can become jammed across the bend between the deflector plate and the inside of the inner side of the conveyor pans defining the bend.

According to the present invention, a scraper chain conveyor with conveyor pans defining a bend round which flight bars are guided in the general plane of the conveyor is provided at the outside of the bend with an auxiliary conveying unit comprising two spaced apart sprockets rotatable about upstanding axes, a line joining the axes being parallel to a tangent to the bend at least when the auxiliary conveying unit is in use, at least one endless auxiliary chain trained round the sprockets, and means for driving the auxiliary chain in a direction such that its chain run adjacent the scraper chain conveyor moves in the direction of feed of the scraper chain conveyor.

Thus lumps of coal or other minerals are no longer inadvertently discharged but are carried by the driven auxiliary chain of the auxiliary conveying unit around the corner.

In detail, the auxiliary chain may be provided with projections or "dogs", for propelling lumps of coal or other mineral round the bend and may thus have an advantageous lump breaking action. According to a preferred feature of the invention, a plurality of co-axial sprockets are rotatable about spaced axes with an endless auxiliary chain trained around each associated pair of sprockets. Thus, three sprockets may be provided on each axis with three driven auxiliary chains.

Conveniently, the auxiliary chain is driven from conventional drive means provided for driving the scraper chain conveyor, thus saving the expense and space required to provide a separate motor and gearbox for the auxiliary chain. Thus, the auxiliary chain may also be trained round a drive sprocket on a drive shaft of the scraper chain conveyor. Thus, with the three sprocket embodiment the uppermost and lowermost chains may extend to and from the drive sprocket on the drive shaft of the scraper chain conveyor.

Alternatively, a drive chain may extend from a sprocket on a drive shaft of the scraper chain conveyor and extend to a drive sprocket co-axially mounted with respect to the nearest sprocket(s) of an auxiliary chain. To control the tension in the drive chain, the latter is preferably threaded through a tensioning device incorporating one or more sprockets, one of which is urged in a tensioning direction by tensioning means e.g. a hydraulic ram.

Although the auxiliary conveying unit may be static, it may prevent an obstruction to the passage of certain types of equipment used in conjunction with the scraper chain conveyor. Thus in coal mining operations, a shearer is often mounted on and/or guided by the conveyor. Therefore in accordance with another embodiment of the present invention, the auxiliary conveying unit is displaceable between active and non-active positions. Conveniently such displacement is under the control of a double-acting hydraulic ram. Thus the ram is retracted to withdraw the auxiliary unit to its non-active position upon approach of a shearer or other equipment associated with the scraper chain conveyor, with the ram being extended to replace the auxiliary conveying unit in its active position after passage or displacement e.g. on a return run of a shearer etc. The ram may be attached to a portion of the structure of the scraper chain conveyor downstream of the bend. The or each auxiliary chain of the auxiliary conveying unit may be driven at the same speed as the scraper chain conveyor or at a greater speed.

The invention will now be described in greater detail, by way of example, with reference to the accompanying drawings, in which:

FIG. 1 is a plan view of a scraper chain conveyor in accordance with the present invention with an auxiliary conveying unit located in its active position;

FIG. 1A is an enlargement of a portion of FIG. 1,

FIG. 2 corresponds to FIG. 1 but shows the auxiliary conveying unit in its non-active position;

FIG. 3 is a side elevation of FIG. 1;

FIG. 4 is a side elevation, to a larger scale, of the auxiliary conveying unit looking in the direction of arrow A of FIG. 2; and FIG. 5 is a plan view of a portion of FIG. 4.

In the drawings, a scraper chain conveyor 1 constructed in the conventional manner, from a plurality of individual pans 2 e.g. of 5' length, secured together end-to-end comprises a first portion 3 and a second portion 4 connected by a 90° bend 5.

The portion 3 extends along a mineral face 6 and a shearer type mining machine 7 is indicated as mounted on, and guided by, the portion 3, the mining machine incorporating a pair of rotary cutting heads 8 mounted on ranging arms 9. The portion 4 extends away from the mineral face 6, along a mine roadway 10 and terminates in a drive or head end 11 comprising an electric motor 12, fluid coupling 13 and a gearbox 14 connected to a drive sprocket 15 for driving a single chain (not shown) of the conveyor 1, to which chain are attached in the well-known manner, a plurality of laterally extending flight bars (not shown).

The bend 5 in the conveyor is constituted by a specially shaped conveyor pan made up of an inner sidewall 16, and an outer sidewall 17, both of conventional sigma section and both welded to a common deck plate 18 which separates an upper run of the conveyor 1 from its lower, return run. As shown in FIGS. 1 and 3, at the bend 5, and beyond the outer sidewall 17 is located an auxiliary conveying unit 19. The auxiliary conveying unit comprises three co-axial sprockets 20 rotatable about a first axis 21 and three co-axial sprockets 22 rotatable about a second axis 23, a line 24 joining the axes 21 and 23 being parallel to a tangent to the bend 5 and in particular to the outer sidewall 17. As best seen in FIGS. 4 and 5, an endless chain 25 is trained around three pairs of associated sprockets, while co-axial with the axis 23 is a drive sprocket 26. The auxiliary conveying unit 19 is mounted on a carriage 27 connected to a double-acting hydraulic ram 28 attached to the conveyor portion 4. The portion 4 is also provided with an arcuate guide track 29 and the carriage 27 with a downwardly projecting guide shoe 30 engaging the track 29. The drive sprocket 26 is connected to a drive chain 31 passing through a chain tensioning arrangement 32 incorporating a hydraulic ram 33, to a drive sprocket 34 mounted on an extension of the conveyor drive sprocket 15, the chain 31 having a drive run 35 and a return run 36.

In use, when the conveyor 1 is running, by operation of the motor 12, conveying of mineral detached from the face 6 is effected in the direction of arrow 40, and simultaneously with rotation of the drive sprocket 15, the drive sprocket 34 is rotated to displace the drive chain 31. This in turn rotates the drive sprocket 26 of the auxiliary conveying unit 19 in the direction shown by arrow 37 so that a run 38 of the chains 25 adjacent the outer sidewall 17 is displaced in the direction of arrow 39 thereby assisting mineral on the conveyor 1 being turned through the bend 5. When it is required to advance the mining machine 7 beyond the position shown in FIG. 1, the ram 28 is retracted to withdraw the auxiliary conveying unit 19 to its non-active position shown in FIG. 2, to provide clearance for the passage of the ranging arms 9.

What I claim is:

1. A scraper chain conveyor comprising conveyor pans defining a bend round which flight bars attached to at least one chain of said conveyor are guided in the general plane of said conveyor, an auxiliary conveying unit provided at the outside of said bend, said auxiliary conveying unit comprising two spaced apart sprockets rotatable about upstanding axes, a line joining said axes being parallel to a tangent to said bend at least when said auxiliary conveying unit is in use, at least one endless auxiliary chain trained round said sprockets, and means for driving said auxiliary chain in a direction such that its chain run adjacent said scraper chain conveyor moves in the direction of feed of said scraper chain conveyor.

2. A conveyor as claimed in claim 1, wherein said auxiliary chain is provided with projections.

3. A conveyor as claimed in claim 1, wherein a plurality of co-axial sprockets are rotatable about spaced upstanding axes, with an endless auxiliary chain trained around each associated pair of sprockets.

4. A conveyor as claimed in claim 1, wherein three sprockets are provided on each of said upstanding axes, with three of said driven auxiliary chains.

5. A conveyor as claimed in claim 1, wherein said auxiliary chain(s) is driven from conventional drive means provided for driving said scraper chain conveyor.

6. A conveyor as claimed in claim 5, comprising a sprocket on a drive shaft of said scraper chain conveyor, a drive chain extending from said conveyor drive shaft sprocket to a drive sprocket co-axially mounted with respect to the nearest sprocket(s) of said auxiliary chain(s).

7. A conveyor as claimed in claim 6, wherein said drive chain is threaded through a tensioning device incorporating one or more sprockets, one of which is urged in a tensioning direction by tensioning means.

8. A conveyor as claimed in claim 7, wherein said tensioning means is a hydraulic ram.

9. A conveyor as claimed in claim 1, wherein said auxiliary conveying unit is static.

10. A conveyor as claimed in claim 1, wherein said auxiliary conveying unit is displaceable between active and non-active positions.

11. A conveyor as claimed in claim 10, wherein displacement of said auxiliary conveying unit is under the control of a double-acting hydraulic ram.

12. A conveyor as claimed in claim 11, wherein said ram is attached to a portion of said scraper chain conveyor downstream of said bend.

13. A conveyor as claimed in claim 12, wherein said auxiliary conveying unit is provided with a downwardly directed support shoe slidably engaging an arcuate guide track of said scraper chain conveyor.

* * * * *